US012753795B2

(12) United States Patent
Worden et al.

(10) Patent No.: US 12,753,795 B2
(45) Date of Patent: Oct. 6, 2026

(54) ELECTRICALLY CONDUCTIVE OVERMOLDED HINGE BUSHING

(71) Applicant: Multimatic Inc., Markham (CA)

(72) Inventors: Scott David Worden, Muskoka Lakes Township (CA); Jeyakumar Subramaniam, Markham (CA)

(73) Assignee: Multimatic Inc., Markham (CA)

( * ) Notice: Subject to any disclaimer, the term of this patent is extended or adjusted under 35 U.S.C. 154(b) by 0 days.

(21) Appl. No.: 19/564,580

(22) Filed: Mar. 12, 2026

(65) Prior Publication Data

US 2026/0201923 A1 Jul. 16, 2026

Related U.S. Application Data

(63) Continuation of application No. PCT/US2024/045776, filed on Sep. 9, 2024.

(Continued)

(51) Int. Cl.

*F16C 17/02* (2006.01)
*F16C 11/04* (2006.01)

(Continued)

(52) U.S. Cl.

CPC .............. *F16C 17/02* (2013.01); *F16C 11/04* (2013.01); *F16C 17/24* (2013.01); *F16C 33/201* (2013.01);

(Continued)

(58) Field of Classification Search

CPC ........ F16C 11/04; F16C 11/045; F16C 17/02; F16C 17/10; F16C 17/12; F16C 17/107;

(Continued)

(56) References Cited

U.S. PATENT DOCUMENTS 7,101,110 B2 9/2006 LaPointe
8,791,375 B2 * 7/2014 Fisher .................... B64D 37/32 174/653

(Continued)

FOREIGN PATENT DOCUMENTS

DE 102006059329 A1 * 6/2008 .............. F16C 33/20

*Primary Examiner* — Phillip A Johnson

(74) *Attorney, Agent, or Firm* — Borden Ladner Gervais LLP; Brandon L. Evenson

(57) ABSTRACT

Electrically conductive overmolded bushings for use in an automotive hinge joint and processes for forming the overmolded bushing. The overmolded bushings comprise an electrically conductive, carbon fiber-filled polymer composite and at least one steel hinge segment of at least two metal hinge segments to be joined provided with a pivot pin aperture. The polymer composite is overmolded to the pivot pin aperture to form a bushing. The bushing is formed with circumferential flanges extending radially from the pivot pin aperture. The circumferential flanges each provided with at least one circumferential rib. The bushing is further formed with an interior cylindrical wall integral with the circumferential flanges and abutting the pivot pin aperture. Carbon fibers in the bushing are exposed by compressing the at least one circumferential rib during assembly of the hinge to create an electrical connection between the at least two metal hinge segments.

14 Claims, 8 Drawing Sheets

Related U.S. Application Data

(60) Provisional application No. 63/537,916, filed on Sep. 12, 2023.

(51) Int. Cl.
*F16C 17/24* (2006.01)
*F16C 33/20* (2006.01)
*F16C 41/00* (2006.01)

(52) U.S. Cl.
CPC ........ *F16C 41/002* (2013.01); *F16C 2202/32* (2013.01); *F16C 2208/02* (2013.01); *F16C 2208/60* (2013.01); *F16C 2220/04* (2013.01); *F16C 2350/54* (2013.01)

(58) Field of Classification Search
CPC .. F16C 33/201; F16C 41/002; F16C 2202/32; F16C 2208/02; F16C 2208/60; F16C 2208/62; F16C 2220/04; E05D 2700/02
See application file for complete search history.

(56) References Cited

U.S. PATENT DOCUMENTS

| | | | | |
|---|---|---|---|---|
| 2003/0044256 | A1* | 3/2003 | Nickerson ................. | F16B 5/02<br>411/338 |
| 2009/0178262 | A1* | 7/2009 | Reid ...................... | B21J 15/105<br>411/60.2 |
| 2011/0049834 | A1* | 3/2011 | Natu ..................... | F16C 33/203<br>29/527.4 |
| 2012/0240350 | A1* | 9/2012 | Natu ...................... | B62K 21/06<br>16/2.2 |
| 2020/0392991 | A1 | 12/2020 | Mansfield | |
| 2020/0392992 | A1* | 12/2020 | Haikney ................. | F16C 17/26 |

* cited by examiner

ELECTRICALLY CONDUCTIVE OVERMOLDED HINGE BUSHING

CROSS-REFERENCE TO RELATED APPLICATIONS

The present application claims priority from U.S. Provisional Patent Application No. 63/537,916, filed on Sep. 12, 2023, the contents being incorporated herein by reference.

FIELD

This application relates to the field of hinges, and in particular, bushings for automotive hinges.

BACKGROUND

In certain automotive hood or decklid hinges, a pivot pin is riveted to join two metal segments which must be rotationally connected at a joint. Typically, a very low friction material is chosen for a bushing to facilitate rotation at the joint. A common choice of such bushing material is PTFE (polyfluoroethylene) or a similar PFAS (per- and polyfluoroalkyl) substance. Such bushings are durable and effective through many rotations of the joint. In many such bushings, a steel liner lies on the exterior of a PTFE portion of the bushing (i.e., the steel liner abuts the hole and the pin rotates on the PTFE surface on the inside of the bushing). The steel liner non-rotationally contacts one of the metal segments of the joint while the PTFE portion rotationally contacts a pivot pin to allow rotation of the joint. Such traditional bushings employ two very different materials, steel and PTFE, to form a complete bushing.

In automotive manufacturing, painting of the hood or decklid, and other body parts, often occurs after the hood or decklid hinge is installed. Typically, electrostatic painting is employed. Often, electricity must pass through the hinge to create an electrical potential in the hood or decklid. One feature of such PTFE bushings is high electrical resistivity and, as a corollary, low electrical conductivity. A traditional PTFE bushing will thus impede the flow of electricity through the hinge to the hood or decklid. Some PTFE bushings have a steel backing. One solution to this resistance/conductivity problem is to provide dimples in the steel liner walls which extend through the PTFE portion of such steel backed bushings to provide a path for electrical connection through the bushing and the hinge.

Recently, concerns have arisen respecting use of so-called "forever chemicals", including PTFE and other PFAS materials, which persist in the environment for a very long time and may result in health and pollution problems. Accordingly, it would be beneficial to have a hinge bushing with similar characteristics to PTFE bushings, which provides electrical conductivity but with a more benign environmental impact and preferably with a simpler construction.

BRIEF DESCRIPTION OF THE DRAWINGS

For a better understanding of the various embodiments described herein and to show more clearly how they may be carried into effect, reference will now be made, by way of example only, to the accompanying drawings in which.

Figure 1:
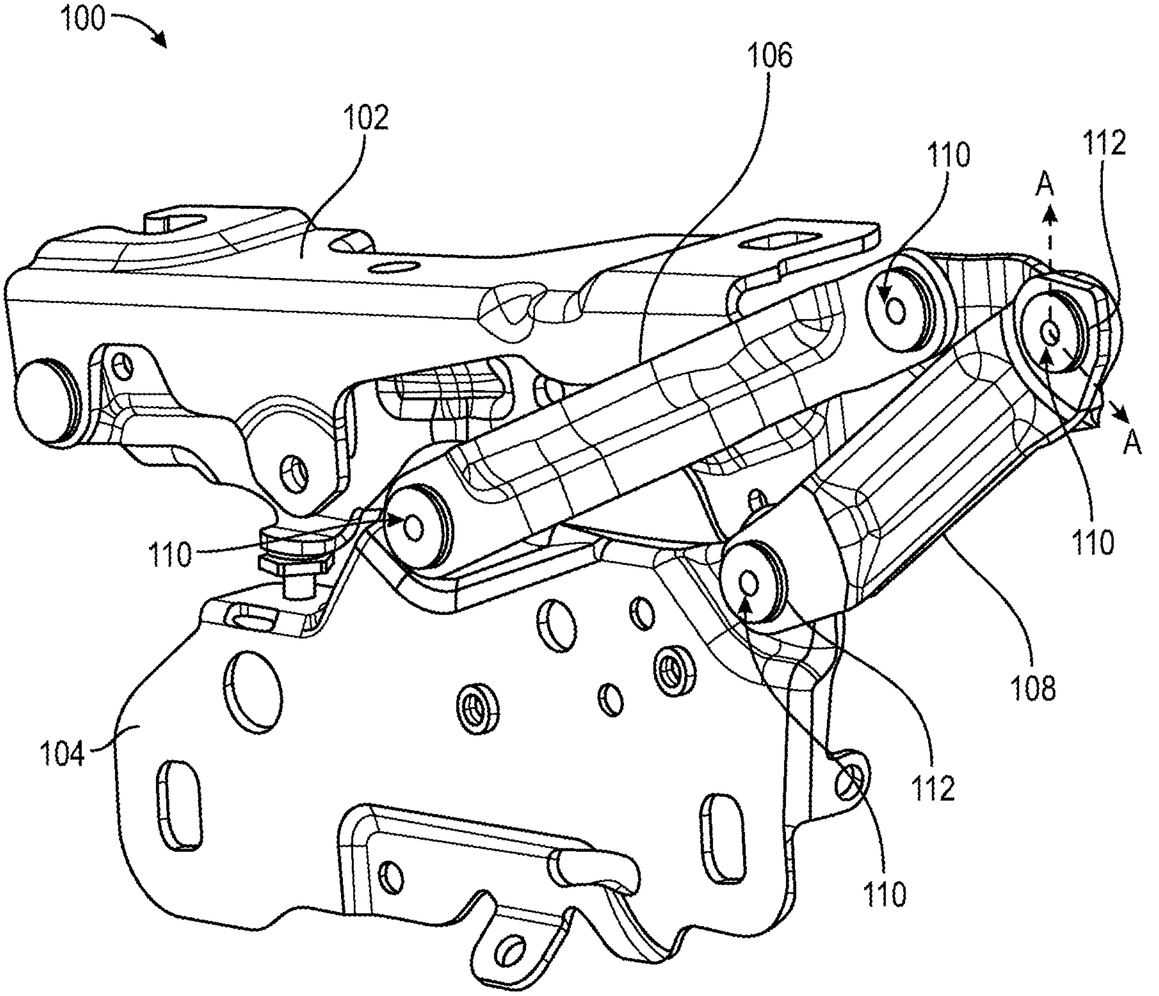
FIG. 1 depicts a four-bar automotive hinge assembly comprising an overmolded bushing, according to non-limiting embodiments.
Figure 2:
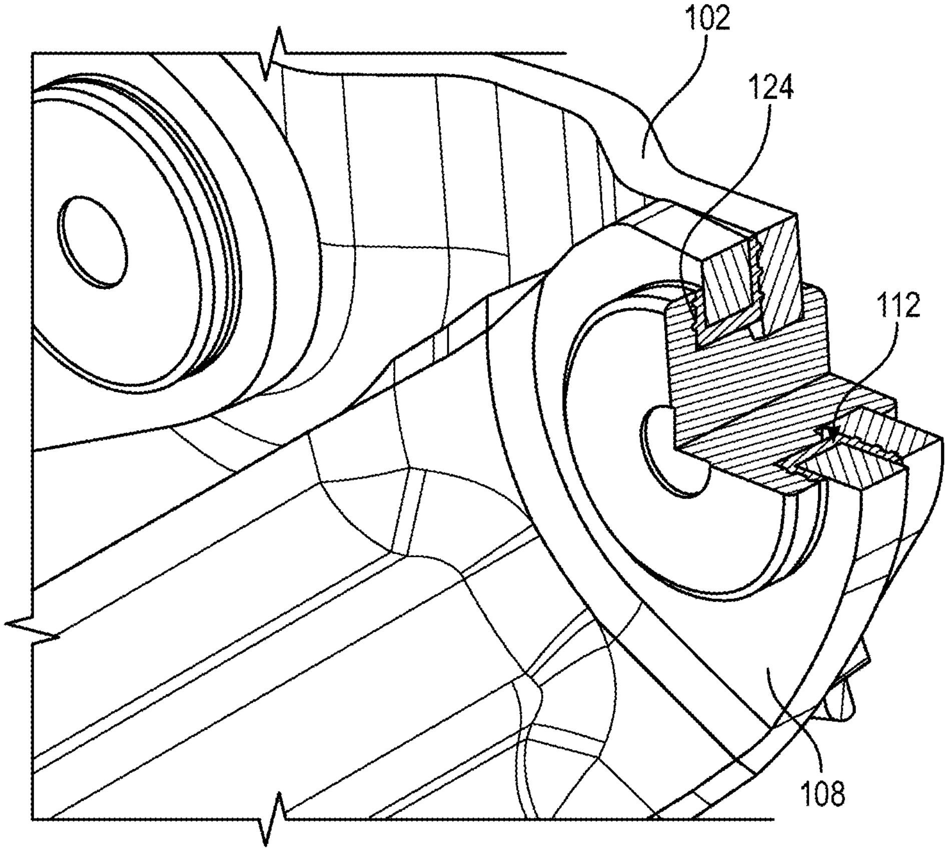
FIG. 2 depicts a sectional view of a joint of FIG. 1 comprising the overmolded bushing taken along section A-A, according to non-limiting embodiments.
Figure 3A:
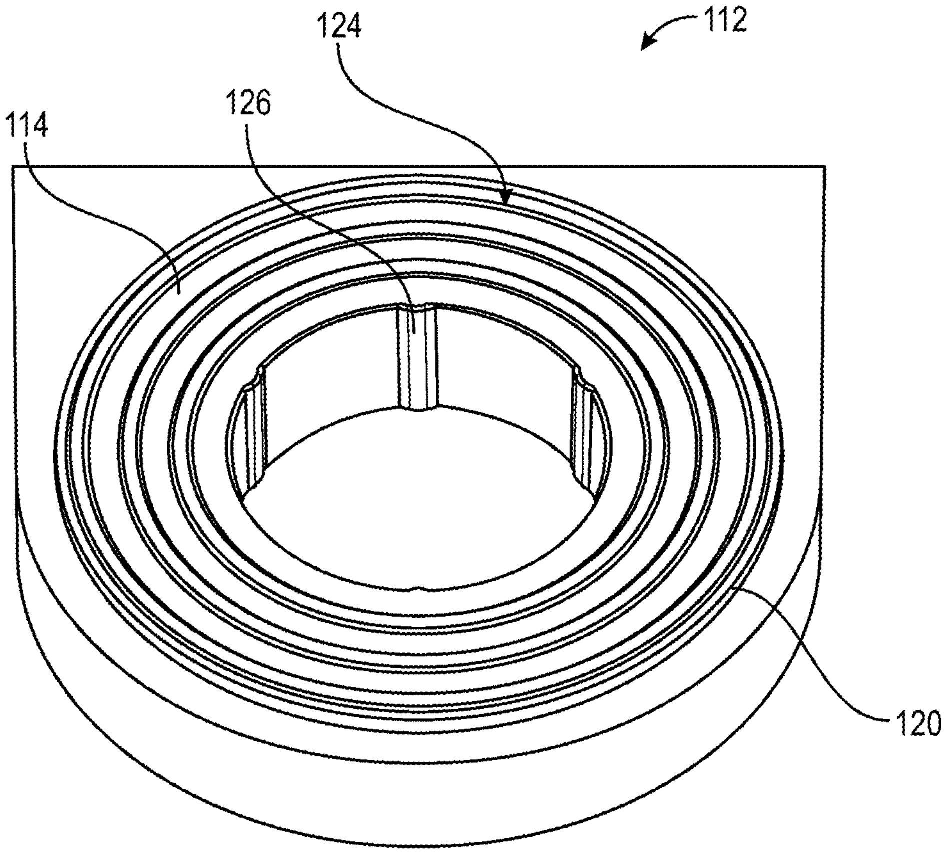
FIG. 3A depicts a bushing, according to non-limiting embodiments.
Figure 3B:
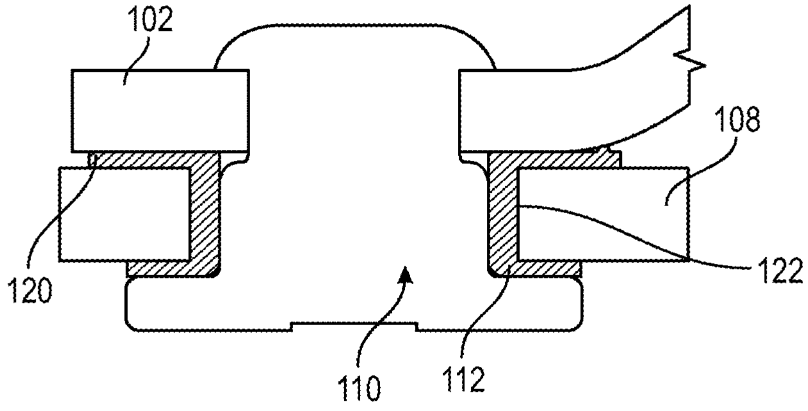
FIG. 3B depicts a cross-sectional view of the bushing depicted in FIG. 1, according to non-limiting embodiments.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

SUMMARY

We have discovered that by overmolding a carbon fiber-filled polymer composite to one of the metal segments of a hinge, the overmolding covering and surrounding a pivot pin aperture in that metal segment, a bushing with low friction and relatively low electrical resistivity can be obtained. The overmolded bushing comprises a central cylindrical wall integral with opposing circumferential flanges. One or more circumferential ribs formed in the flanges during the overmolding assist in keeping foreign materials out of the assembled hinge. One or more longitudinal ribs formed on the central, interior cylindrical wall of the bushing may assist with a secure fitting of the bushing to the pivot pin of the hinge. Surprisingly, an electrical connection between the metal segments of the hinge is markedly increased by, during hinge assembly, compressing, or crushing these ribs to expose carbon fibers to the metal segments of the hinge.

According to some embodiments, there is provided an electrically conductive overmolded bushing for use in an automotive hinge joint comprises an electrically conductive fiber-filled polymer composite. The polymer composite is overmolded to a pivot pin aperture of a steel hinge segment to form a bushing. The bushing is formed with circumferential flanges extending radially from the pivot pin aperture. The bushing is further formed with an interior cylindrical wall integral with the circumferential flanges and abutting the pivot pin aperture. The circumferential flanges are each provided with at least one circumferential rib. Assembly of the hinge crushes these circumferential ribs to expose carbon fibers to metal segments of the hinge to increase the electrical connection between the segments.

In a further embodiment, the circumferential flanges are each provided with a plurality of circumferential ribs.

In a further embodiment, the interior cylindrical wall is provided with at least one longitudinal rib.

In a further embodiment, the interior cylindrical wall is provided with a plurality of longitudinal ribs.

In a further embodiment, the polymer composite for the bushing is lubricated polyamide 4/6, 30% carbon fiber.

According to another embodiment, there is provided a process for forming an electrically conductive overmolded bushing for use in an automotive hinge joint comprises overmolding an electrically conductive, carbon fiber-filled polymer composite to a pivot pin aperture of a first steel hinge segment to form a bushing; during overmolding, integrally forming at least one circumferential rib in each of two opposing circumferential flanges extending radially from the pivot pin and an interior cylindrical wall of the bushing; riveting a pivot pin through the bushing to rotationally connect the first steel hinge segment to a second steel hinge segment; the riveting causing compression of the at least one circumferential rib to expose carbon fibers and to create an electrical connection between the first and second steel hinge segments through the bushing.

In a further embodiment of the process, a plurality of circumferential ribs is formed in each of the circumferential flanges.

In a further embodiment of the process, at least one longitudinal rib is formed on the interior cylindrical wall.

In a further embodiment of the process, a plurality of longitudinal ribs is formed on the interior cylindrical wall.

In a further embodiment of the process, the polymer composite of the bushing comprises a lubricated polyamide 4/6, 30% carbon fiber.

In a further embodiment, the polymer composite of the bushing is non-PFAS and non-PTFE.

DETAILED DESCRIPTION

Described is a fiber-filled polymer composite that is overmolded to one of the metal, typically steel, segments of a hinge, to cover and surround a pivot pin aperture in the segment. This typically produces a bushing with low friction and relatively low electrical resistivity. The polymer composite material of the bushing does not have the same environmental concerns as do PTFE or PFAS bushing materials. The overmolded bushing is ready for installation of a pivot pin to complete the hinge. It typically requires no installation into the pivot pin aperture prior to installation of the pivot pin, unlike a discrete PTFE bushing. In addition, the bushing is overmolded from a single polymer composite material, without the need for a steel backing.

The overmolding technique also allows the formation of crush ribs on flanges surrounding the pivot pin aperture which assist in resisting entry of foreign materials, like dust or other debris, to the interior of the completed hinge joint. One or multiple circumferential crush ribs may be provided on each of the bushing flanges to provide a single barrier, or sequential barriers, to dust and other foreign materials. Surprisingly, compressing or crushing of these circumferential ribs during assembly of the hinge exposes carbon fibers to the steel segments of the hinge and markedly increases the electrical connection between these hinge segments separated by the bushing. Longitudinal crush ribs may also be added to the interior, cylindrical wall of the bushing, to provide a firmer connection to the pivot pin for added hinge stability. The flanges and the interior wall of the bushing are integrally formed during overmolding.

A suitable polymer for the bushing is lubricated polyamide 4/6, 30% carbon fiber, for example, Stanyl TW200B.

Thus, the polymer composite overmolded bushing meets the functional requirements previously satisfied by PTFE bushings without the same environmental concerns. The overmolded bushing provides a single material, low friction surface without the need for additional lubrication. Its electrical conductivity makes the overmolded bushing suitable for electrostatic painting of a hood or decklid, or any similar hinged part. Moreover, the circumferential crush ribs on the bushing flanges prevent ingress of foreign substances into the joint while markedly increasing the electrical connection between the metal hinge segments separated by the bushing when the hinge is assembled. The longitudinal crush ribs on the interior cylindrical wall of the bushing provide a radial interference fit of the bushing and the pivot pin and eliminate radial free play in the joint.

It will be appreciated that for simplicity and clarity of illustration, where considered appropriate, reference numerals may be repeated among the figures to indicate corresponding or analogous elements. In addition, numerous specific details are set forth in order to provide a thorough understanding of the exemplary aspects of the present application described herein. However, it will be understood by those of ordinary skill in the art that the exemplary aspects described herein may be practiced without these specific details. In other instances, well-known methods, procedures and components have not been described in detail so as not to obscure the exemplary aspects described herein. Also, the description is not to be considered as limiting the scope of the exemplary aspects described herein. Any systems, method steps, method blocks, components, parts of components, and the like described herein in the singular are to be interpreted as also including a description of such systems, method steps or tasks, components, parts of components, and the like in the plural, and vice versa.

Attention is directed to FIG. 1, which depicts a four-bar hinge assembly 100, according to non-limiting embodiments. Hinge assembly 100 is typically for use with vehicle hood hinges, however, any suitable joint application for the described overmolded bushing and related process is contemplated. Hinge assembly 100 comprises hood bracket 102, body bracket 104, longer link 106, short link 108 and pivot pins 110. Hinge assembly 100 further comprises overmolded bushings 112 (also referred to herein as electrically conductive overmolded bushing 112).

As shown in FIGS. 2 to 7B, overmolded bushing 112 comprises an electrically conductive, carbon fiber-filled polymer composite 114. The overmolded bushing is preferably non-PFAS and non-PTFE. According to some embodiments, the polymer composite comprises lubricated polyamide 4/6, 30% carbon fiber, such as Stanyl® TW200B. The carbon fibers help provide at least some electrical conductivity. According to some embodiments, the electrical resistivity is a maximum of 100Ω. The resulting overmolded bushing allows the hinge and joint to be processed at high temperatures. For example, bushing 112 may be exposed to a drying heat of up to 200° C.

Figure 4:
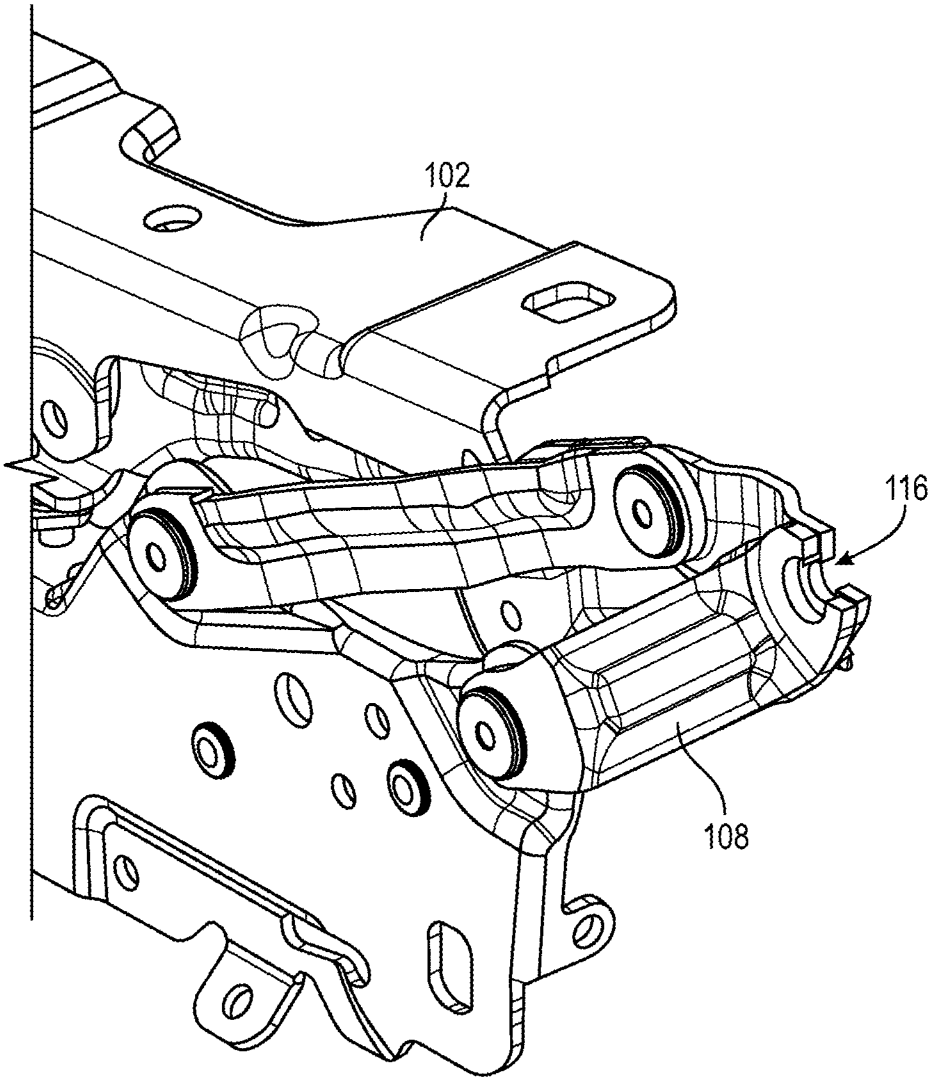
FIG. 4 depicts the four-bar automotive hinge assembly of FIG. 1 with a sectional view of a joint absent a pivot pin and overmolded bushing, according to non-limiting embodiments.
Figure 5:
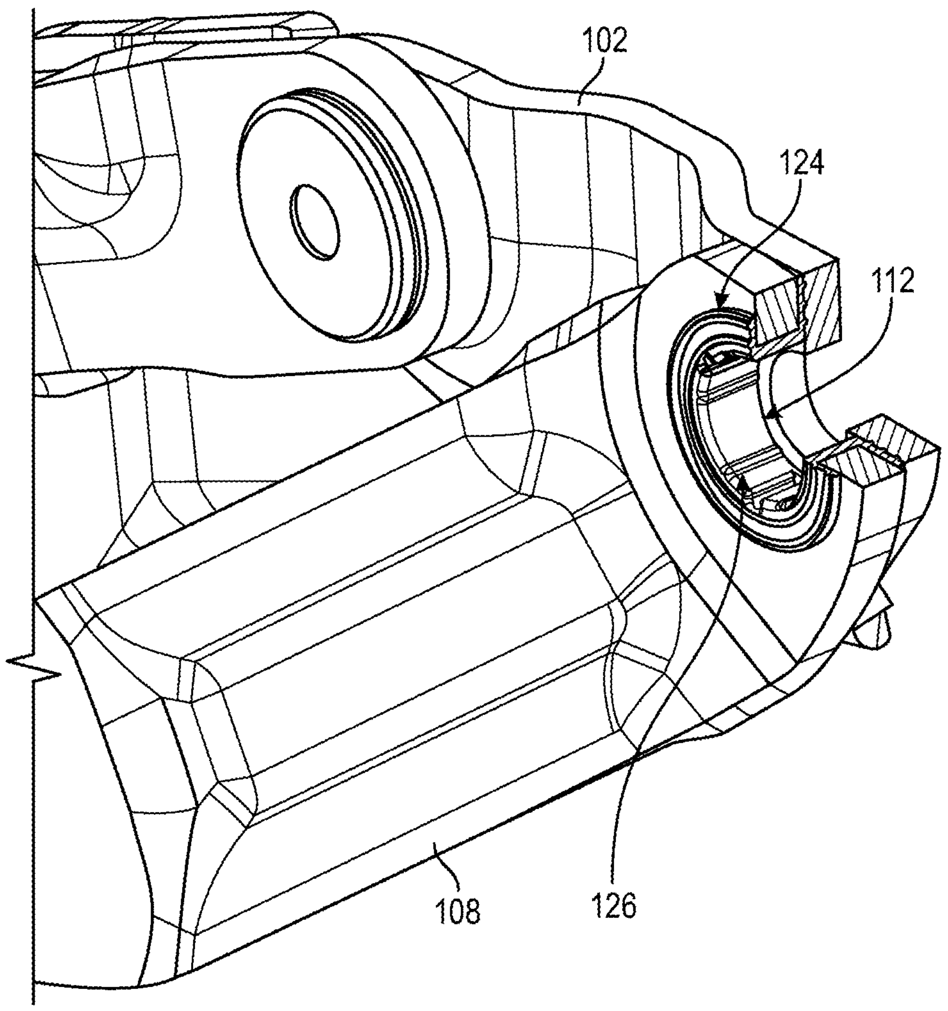
FIG. 5 depicts the sectional view of the joint of FIG. 2 absent the pivot pin and with the bushing depicted in FIG. 2, according to non-limiting embodiments.
Figure 6:
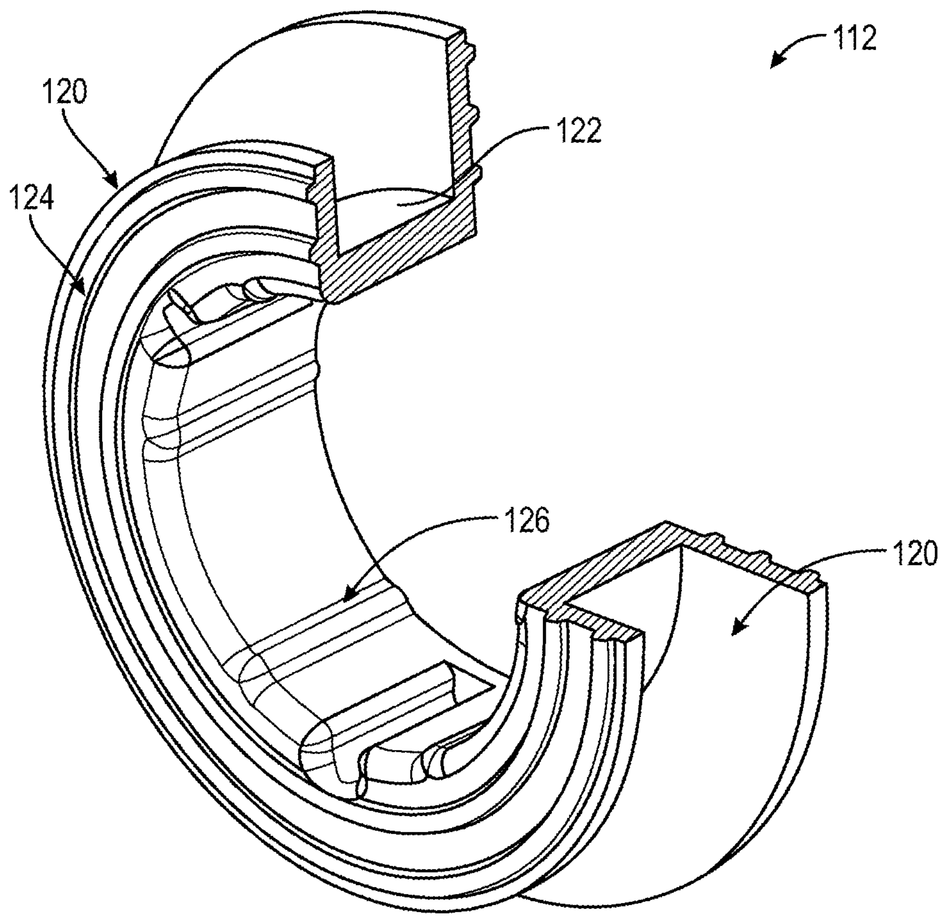
FIG. 6 depicts a sectional view of an isolated overmolded bushing, according to non-limiting embodiments.

At least one metal hinge segment of at least two metal hinge segments to be joined is provided with a pivot pin aperture, such as hood bracket 102 and short link 106 having aperture 116 (FIG. 4). According to some embodiments, the metal is steel, although any suitable metal is contemplated. The polymer composite 114 is overmolded to the aperture 116 to form bushing 112. Bushing 112 comprises circumferential flanges 120 extending radially from the pivot pin aperture 116. Although FIGS. 2 to 6 depict circumferential flanges of uneven radial length, according to some embodiments the circumferential flanges are of equal or generally equal radial length. Bushing 112 is further formed with an interior cylindrical wall 122 integral with the circumferential flanges and abutting the pivot pin aperture 116.

With injection over-molded components, the majority of the reinforced fibers of the over-mold tend to stay below the outer skin, thus resulting in high resistivity at the outer skin. To address this, bushing 112 incorporates at least one crush rib that when compressed or otherwise deformed exposes the electrically conductive fibers. Each of circumferential flanges 120 is provided with at least one circumferential rib 124. According to some embodiments, circumferential rib 124 comprises one circumferential rib. According to some embodiments, each of circumferential flanges 120 is provided with a plurality of circumferential ribs 124.

According to some embodiments, interior cylindrical wall 122 is provided with at least one longitudinal rib, such as longitudinal ribs 126. According to some embodiments longitudinal ribs 126 comprises one longitudinal rib. According to some embodiments, longitudinal ribs 126 comprises a plurality of longitudinal ribs.

Figure 7A:
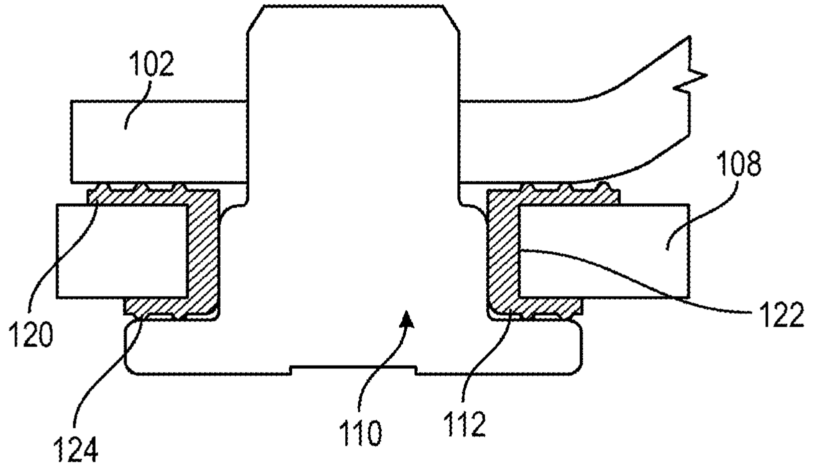
FIGS. 7A and 7B depict cross-sectional views of a joint comprising an overmolded bushing pre-installation (FIG. 7A) and post-installation (FIG. 7B), according to non-limiting embodiments.
Figure 7B:
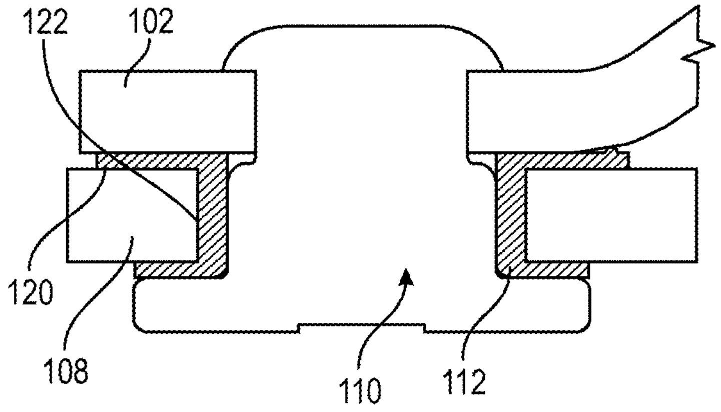

During assembly of the hinge the carbon fibers in the bushing 112 are exposed by compressing the at least one circumferential rib 124 to create an electrical connection between the two steel hinge segments. For example, during joint assembly by, for example, riveting or staking the circumferential and/or longitudinal ribs are deformed and the bushing inner diameter increases by virtue of the pin being pressed into the pivot pin aperture 116 (FIGS. 7A and 7B). Again, these deformations expose at least some of the electrically conductive carbon fibers in the over-mold surface. The carbon fibers then come into contact with the adjacent metal parts (the metal hinge segments) to form an electrical conduit through the joint. The resulting radial interference fit generally eliminates radial free play in the joint and the deformed crush ribs prevent ingress of foreign substances, like dust, into the joint.

Figure 8:
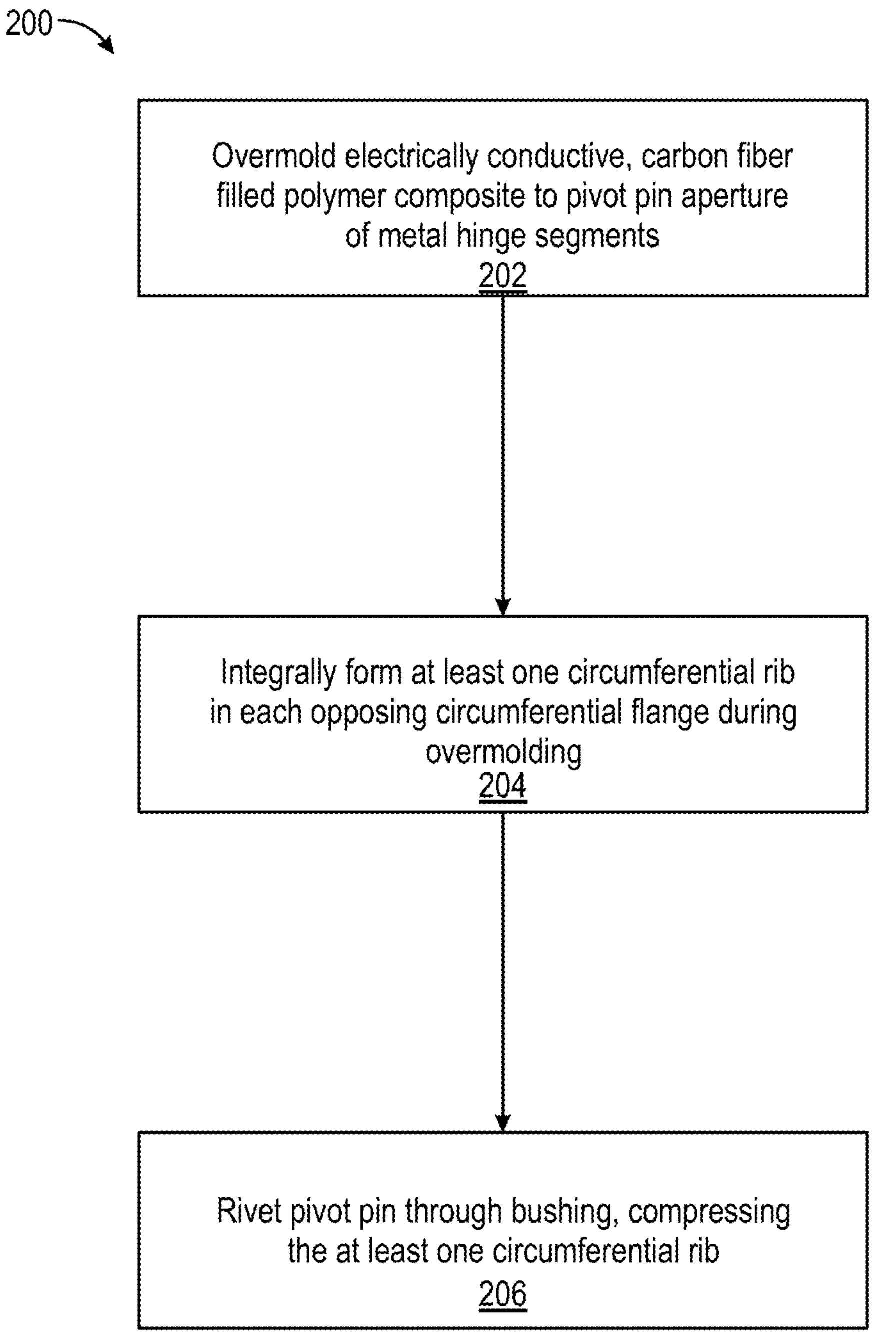
FIG. 8 depicts a method for forming an electrically conductive overmolded bushing for use in an automotive hinge joint, according to non-limiting embodiments.

Attention is directed to FIG. 8, which depicts example method 200 for forming an electrically conductive overmolded bushing for use in an automotive hinge joint. In order to assist in the explanation of method 200, it will be assumed that method 200 is performed using the joints and bushings depicted in FIGS. 1 to 7B, as indicated. Furthermore, the following discussion of method 200 will lead to a further understanding of the joints and bushings depicted in FIGS. 1 to 7B and the various components as described herein. However, it is understood that method 200 can be varied, and need not work exactly as discussed herein, and that such variations are within the scope of the present application. It is also emphasized, however, that method 200 need not be performed in the exact sequence as shown, unless otherwise indicated; and likewise various blocks may be performed in parallel rather than in sequence. Hence, the elements of method 200 are referred to herein as "blocks" rather than "steps".

At block 202, an electrically conductive, carbon fiber-filled polymer composite is overmolded to a pivot pin aperture of a first steel hinge segment to form a bushing, such as bushing 112. The polymer composite is preferably non-PFAS and non-PTFE. For example, according to some embodiments, the polymer composite comprises a lubricated polyamide 4/6, 30% carbon fiber.

At block 204, during the overmolding of block 202, at least one circumferential rib, such a circumferential rib 124, is integrally formed in each of two opposing circumferential flanges that extend radially from the pivot pin and an interior cylindrical wall of the bushing. According to some embodiments, one circumferential rib is formed on each circumferential flange. According to some embodiments, a plurality of circumferential ribs is formed in each circumferential flange. According to some embodiments, simultaneously or concurrently with block 204, at least one longitudinal rib is formed on the interior cylindrical wall, such as longitudinal rib 126. According to some embodiments, one longitudinal rib is formed. According to some embodiments, a plurality of longitudinal ribs is formed.

At block 206, a pivot pin is rivetted through the bushing to rotationally connect the first metal hinge segment to a second metal hinge segment, such as pivot pin 110 rivetted through bushing 112. As discussed above, the riveting causes compression of the at least one circumferential rib which exposes at least some of the carbon fibers in the polymer composite and creates an electrical connection between the first and second metal hinge segments through the bushing.

It will also be understood that for the purposes of this application, "at least one of X, Y, and Z" or "one or more of X, Y, and Z" language can be construed as X only, Y only, Z only, or any combination of two or more items X, Y, and Z (e.g., XYZ, XYY, YZ, ZZ, XX, XY).

In the present application, components may be described as being "configured to" or "enabled to" perform one or more functions. Generally, it is understood that a component that is configured to or enabled to perform a function is configured to or enabled to perform the function, or is suitable for performing the function, or is adapted to perform the function, or is operable to perform the function, or is otherwise capable of performing the function.

Additionally, components in the present application may be described as being "operatively connected to", "operatively coupled to", and the like, to other components. It is understood that such components are connected or coupled to each other in a manner to perform a certain function. It is also understood that "connections", "coupling" and the like, as recited in the present application include direct and indirect connections between components.

References in the application to "one embodiment", "an embodiment", "an implementation", "a variant", etc., indicate that the embodiment, implementation or variant described may include a particular aspect, feature, structure, or characteristic, but not every embodiment, implementation or variant necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely", "only", and the like, in connection with the recitation of claim elements or use of a "negative" limitation. The terms "preferably", "preferred", "prefer", "optionally", "may", and similar terms are used to indicate that an item, condition or step being referred to is an optional (not required) feature.

The singular forms "a", "an", and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

In embodiments, the various components of the hinge may be manufactured using various manufacturing methods, such as stamping, forging, and casting. In embodiments, the various components of the hinge may be fabricated from various types of materials, such as metal and plastic. In some embodiments, a lubricant or a material with impregnated lubricant may be used.

Persons skilled in the art will appreciate that there are yet more alternative implementations and modifications possible, and that the above examples are only illustrations of one or more implementations. The scope, therefore, is only to be limited by the claims appended hereto.

The invention claimed is:

1. An electrically conductive overmolded bushing for use in an automotive hinge joint comprising:
- an electrically conductive, carbon fiber-filled polymer composite;
- at least one steel hinge segment of at least two metal hinge segments to be joined provided with a pivot pin aperture;
- the polymer composite overmolded to the pivot pin aperture to form a bushing;
- the bushing formed with circumferential flanges extending radially from the pivot pin aperture;
- the circumferential flanges each provided with at least one circumferential rib; and
- the bushing further formed with an interior cylindrical wall integral with the circumferential flanges and abutting the pivot pin aperture;
- such that carbon fibers in the bushing are exposed by compressing the at least one circumferential rib during assembly of the hinge to create an electrical connection between the at least two metal hinge segments.

2. The electrically conductive overmolded bushing for use in an automotive hinge joint of claim 1, wherein the polymer composite is non-PFAS and non-PTFE.

3. The electrically conductive overmolded bushing for use in an automotive hinge joint of claim 1, wherein the circumferential flanges are each provided with a plurality of circumferential ribs.

4. The electrically conductive overmolded bushing for use in an automotive hinge joint of claim 1, wherein the interior cylindrical wall is provided with at least one longitudinal rib.

5. The electrically conductive overmolded bushing for use in an automotive hinge joint of claim 1, wherein the interior cylindrical wall is provided with a plurality of longitudinal ribs.

6. The electrically conductive overmolded bushing for use in an automotive hinge joint of claim 1, wherein the polymer composite for the bushing is lubricated polyamide 4/6, 30% carbon fiber.

7. The electrically conductive overmolded bushing for use in an automotive hinge joint of claim 1, wherein the at least two metal hinge segments comprise steel.

8. A process for forming an electrically conductive overmolded bushing for use in an automotive hinge joint comprising:
- a) overmolding an electrically conductive, carbon fiber-filled polymer composite to a pivot pin aperture of a first metal hinge segment to form a bushing;
- b) during overmolding, integrally forming at least one circumferential rib in each of two opposing circumferential flanges extending radially from the pivot pin and an interior cylindrical wall of the bushing; and
- c) riveting a pivot pin through the bushing to rotationally connect the first metal hinge segment to a second metal hinge segment;
- d) the riveting causing compression of the at least one circumferential rib to expose carbon fibers and to create an electrical connection between the first and second metal hinge segments through the bushing.

9. The process of claim 8, wherein a plurality of circumferential ribs is formed in each of the circumferential flanges.

10. The process of claim 8, wherein at least one longitudinal rib is formed on the interior cylindrical wall.

11. The process of claim 8, wherein a plurality of longitudinal ribs is formed on the interior cylindrical wall.

12. The process of claim 8, wherein the polymer composite is non-PFAS and non-PTFE.

13. The process of claim 8, wherein the polymer composite of the bushing comprises a lubricated polyamide 4/6, 30% carbon fiber.

14. The process of claim 8, wherein the first metal segment and the second metal segment comprise steel.

* * * * *